(12) United States Patent
Yang et al.

(10) Patent No.: US 7,511,401 B2
(45) Date of Patent: Mar. 31, 2009

(54) ROTOR OF MOTOR

(75) Inventors: Tae-weon Yang, Gyeongsangnam-Do (KR); Chang-Sub Kim, Sasang-Gu (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 11/339,665

(22) Filed: Jan. 26, 2006

(65) Prior Publication Data

US 2006/0163966 A1    Jul. 27, 2006

Related U.S. Application Data

(63) Continuation-in-part of application No. 10/968,977, filed on Oct. 21, 2004, now abandoned.

(30) Foreign Application Priority Data

May 25, 2004   (KR) .................. 10-2004-0037559

(51) Int. Cl.
*H02K 1/00* (2006.01)
(52) U.S. Cl. .................. 310/269; 310/261; 310/216
(58) Field of Classification Search ......... 310/214–218, 310/195, 196, 261, 269
See application file for complete search history.

(56) References Cited

U.S. PATENT DOCUMENTS

| | | | |
|---|---|---|---|
| 1,675,419 A | 7/1928 | Myers | |
| 3,235,762 A | 2/1966 | Brammerlo | |
| 3,575,650 A | 4/1971 | Fengler | |
| 4,197,477 A | 4/1980 | Reynolds | |
| 4,282,450 A | 8/1981 | Eckels | |
| 4,453,097 A | 6/1984 | Lordo | |
| 4,467,231 A | 8/1984 | Biglino | |
| 4,730,136 A | 3/1988 | Muller | |
| 4,780,635 A * | 10/1988 | Neumann | 310/216 |
| 4,881,002 A | 11/1989 | Yamaguchi | |
| 4,902,941 A | 2/1990 | Merkle et al. | |
| 5,663,601 A | 9/1997 | Wakabayashi et al. | |
| 6,100,610 A | 8/2000 | Katagiri et al. | |
| 6,316,850 B1 | 11/2001 | Nakamura | |
| 6,376,963 B1 | 4/2002 | Furuya et al. | |
| 6,441,529 B1 | 8/2002 | Mimura et al. | |
| 6,674,211 B2 | 1/2004 | Katou et al. | |
| 6,791,231 B2 | 9/2004 | Chang | |
| 6,806,614 B2 | 10/2004 | Kuroyanagi et al. | |

FOREIGN PATENT DOCUMENTS

EP    0562505 A1    9/1993

\* cited by examiner

*Primary Examiner*—Dang D Le
(74) *Attorney, Agent, or Firm*—Birch, Stewart, Kolasch & Birch, LLP

(57) ABSTRACT

A rotor of a motor includes: a stator; a rotor core of a certain shape; a winding coil wound on the rotor core; and a rotor rotated by an electromagnetic interaction with the stator, in which both sides of an end wall of each slot of the I rotor core where the winding coil is inserted are respectively provided with a corner portion to connect both lateral walls of each slot. As a result, the effective area of a flux is increased thereby to decrease flux resistance and to reduce a stacked height of the rotor, that is, the number of stacked thin plates.

18 Claims, 6 Drawing Sheets

FIG. 8

| Motor having rotor of the present invention (stacked height of rotor: 42 mm) | | | Motor having rotor of the conventional art (stacked height of rotor: 52 mm) | | |
|---|---|---|---|---|---|
| Torque | RPM | Efficiency | Torque | RPM | Efficiency |
| 0.34 | 11881 | 12.41 | 0.24 | 11498 | 7.66 |
| 1.10 | 11517 | 38.73 | 1.01 | 11200 | 30.70 |
| 1.96 | 11008 | 53.74 | 1.58 | 10961 | 46.15 |
| 2.44 | 10696 | 63.93 | 1.96 | 10669 | 55.28 |
| 3.11 | 10288 | 68.14 | 2.34 | 10348 | 62.32 |
| 3.78 | 9817 | 71.79 | 2.82 | 9912 | 68.74 |
| 4.45 | 9317 | 89.90 | 3.78 | 9442 | 85.44 |
| 4.83 | 8718 | 90.00 | 4.21 | 8984 | 84.25 |
| 5.69 | 8150 | 85.65 | 4.74 | 8451 | 85.63 |
| 6.27 | 7638 | 82.89 | 5.41 | 7984 | 85.23 |
| 6.94 | 7105 | 78.03 | 6.08 | 7397 | 51.85 |
| 7.70 | 6652 | 71.72 | 6.65 | 6874 | 78.99 |
| 8.63 | 6168 | 69.65 | 7.03 | 6461 | 72.44 |
| 9.14 | 5761 | 64.54 | 8.18 | 5991 | 71.65 |
| 9.62 | 5452 | 62.30 | 8.85 | 5662 | 70.22 |
| 10.67 | 5109 | 58.14 | 9.90 | 5397 | 65.93 |
| 13.06 | 4631 | 56.41 | 10.76 | 5102 | 64.09 |
| 13.82 | 4390 | 54.77 | 11.62 | 4845 | 63.63 |
| 15.74 | 3964 | 49.68 | 12.58 | 4532 | 60.83 |
| 17.56 | 3520 | 46.93 | 13.54 | 4246 | 56.97 |

ROTOR OF MOTOR

CROSS-REFERENCES TO RELATED APPLICATIONS

This application is a Continuation-In-Part of application Ser. No. 10/968,977, filed on Oct. 21, 2004 now abandoned, the entire contents of which are hereby incorporated by reference and for which priority is claimed under 35 U.S.C. § 120. This nonprovisional application also claims priority under 35 U.S.C. § 119(a) on Patent Application No. 10-2004-0037559 filed in Republic of Korea on May 25, 2004, the entirety of which is herein incorporated by reference.

BACKGROUND OF THE INVENTION

1. Field of the Invention

The present invention relates to a motor, and more particularly, to a rotor of a motor capable of maximizing a flow path of a flux and decreasing a size thereof.

2. Description of the Conventional Art

Generally, a motor is a device for converting electric energy into kinetic energy, and the motor is being used as a driving source of many machines.

There are many types of motors, such as a direct current motor, a brushless motor, an induction motor, a synchronous motor, a universal motor, etc., depending upon its use.

FIGS. 1 and 2 are respective frontal and lateral section views showing one embodiment of a universal motor.

As shown, the universal motor comprises: a stator 100 having a through hole 111 therein; a rotor 200 rotatably inserted into the through hole 111 of the stator; a rotational shaft 300 inserted into the center of the rotor; and a commutator 400 and a brush 500 coupled to the rotational shaft 300 and supplying a current.

The stator includes: a core 110 of a certain shape; and a winding coil 120 wound on the core 110. The core 110 is provided with a through hole 111 penetrated in a longitudinal direction therein. A plurality of slots S penetrated in a longitudinal direction are formed at fixed intervals along the edge of the through hole 111, and teeth T are formed between said slots S. The slot S is composed of s an opening portion 112 connected to the through hole 111, and an extension portion 113 extendingly formed from the opening portion 112 and in which the winding coil 120 is positioned. A width of the extension portion 113 is gradually increased towards the outside of the opening portion 112, and the end of the extension portion 113 is a curved surface of a semi-circle.

The core 110 of the stator is formed as a plurality of stacked thin plates 10 having a shape corresponding to a sectional surface of the core 110.

The rotor 200 includes: a core 210 of a certain shape; and a winding coil 220 wound on the core 210. The core 210 is provided with a plurality of slots S penetrated at fixed intervals along the edge of a cylindrical body portion 211 is having a certain length in a longitudinal direction, and teeth T are formed between the slots S. As shown in FIG. 3, the slot S is composed of an opening portion 212 formed at an outer circumferential surface of the cylindrical body portion 211, and an extension portion 213 extendingly formed towards the inside of the opening portion 112 and in which the winding coil 220 is positioned. A width of the extension portion 213 is decreased towards the center of the cylindrical body portion 211, and the end of the extension portion 213 is formed as a curved surface wall 214 of a semi-circle shape. The curved surface wall 214 is located at an opposite direction from an outer circumferential surface of the cylindrical body portion 211. A width of the extension portion 213 is gradually decreased towards the inside of the opening portion 212, so that a width of a portion of each tooth located between two adjacent extension portions 213 is constant.

An axial hole 215 into which the rotational shaft 300 is inserted, is penetratingly formed at the center of the cylindrical body portion 211.

The core 210 of the rotor is formed as a plurality of stacked thin plates 20 having a shape corresponding to a sectional surface of the cylindrical body portion 211.

The operation of the universal motor will be explained as follows.

When power is supplied to the winding coil 120, a flux is formed at the stator core 110. At the same time, when power is supplied to the winding coil 220 through the brush 500 and the commutator 400, a flux is formed at the rotor core 210. By an interaction between the flux formed at the stator core 110 and the flux formed at the rotor core 210, the rotor 200 is rotated. A rotation force of the rotor 200 is transmitted to a load through the rotational shaft 300.

The universal motor is usually used as a power source of a washing machine or a vacuum cleaner, etc. A miniaturization of the universal motor is required in order to minimize a mounting space inside the washing machine or the vacuum cleaner, and the fabrication costs of the motor has to be lowered to achieve price competitiveness.

The core is one part of the universal motor that should be minimized in size and have low fabrication cost while maintaining its function.

The stator and the core constituting the rotor of the universal motor are formed as a stacked body with a plurality of thin plates having a certain shape being stacked in order to minimize power loss due to eddy current.

A shape of the core and the number of the thin plates constituting the core are set to maintain high efficiency by minimizing the loss of a flux formed at the core by the current applied to the winding coil.

However, in the conventional core of the universal motor, the inner side portion of each slot S in which the winding coil is inserted is formed as a curved surface of a semi-circle shape in order to simplify the manufacturing process when s using a punch or press. According to this, the winding coil can not be densely inserted into the slots S, which results in a decrease in an effective area of the guaranteed flux, generation of flux loss, and requiring an increased number of thin plates constituting the core.

SUMMARY OF THE INVENTION

Therefore, an object of the present invention is to provide a rotor of a motor capable of maximizing a flow path of a flux and decreasing a size thereof.

To achieve these and other advantages and in accordance with the purpose of the present invention, as embodied and broadly described herein, there is provided a rotor of a motor comprising: a stator; a rotor core of a certain shape; a winding coil wound on the rotor core; and a rotor rotated by an electromagnetic interaction with the stator, in which both sides of an end wall of each slot of the rotor core where the winding coil is inserted are respectively provided with a corner portion to connect both lateral walls of each slot.

To achieve these and other advantages and in accordance with the purpose of the present invention, as embodied and broadly described herein, there is also provided a rotor of a motor comprising: a rotor core rotatably penetration-inserted into a stator; and a winding coil wound on the rotor core, in which the rotor core includes: a cylindrical body portion having a certain length; a shaft hole penetratingly formed at a center of the cylindrical body portion; a plurality of slots penetratingly formed at an edge of the cylindrical body portion in a longitudinal direction and receiving the winding coil therein; and a plurality of teeth formed between the slots and on which the winding coil is wound, wherein each slot is composed of: an opening portion formed at an outer circumferential surface of the cylindrical body portion with a certain width; an extension portion connected to the opening portion and penetratingly formed as an angle shape in a longitudinal direction; and a corner portion respectively formed at both ends of an end wall of the extension portion located at an opposite side to the opening portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 shows experimental results when comparing the motor having a rotor of the present invention with the conventional motor.

DETAILED DESCRIPTION OF THE PREFERRED EMBODIMENTS

Reference will now be made in detail to the preferred embodiments of the present invention, examples of which are illustrated in the accompanying drawings.

Hereinafter, a rotor of a motor of the present invention will be explained in more detail with reference to the attached drawings.

Figure 1:
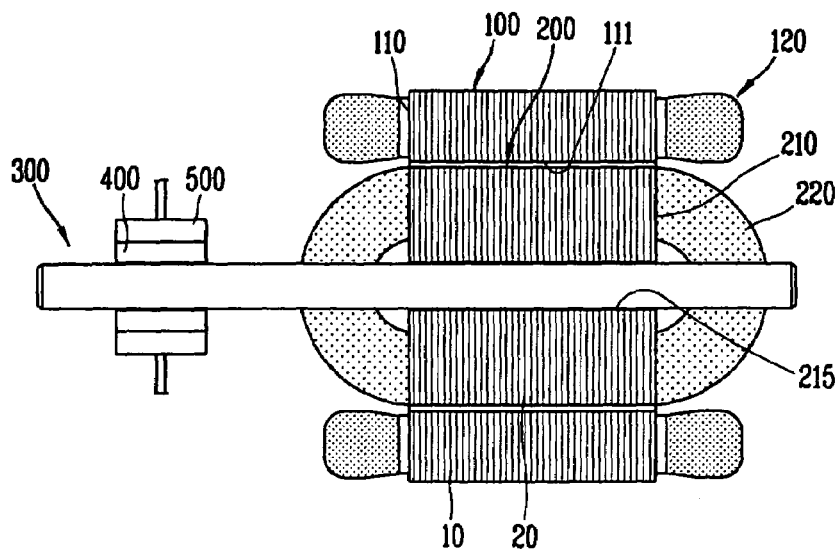
FIGS. 1 and 2 are respectively a lateral section view and a frontal section view of a universal motor in accordance with the conventional art.
Figure 2:
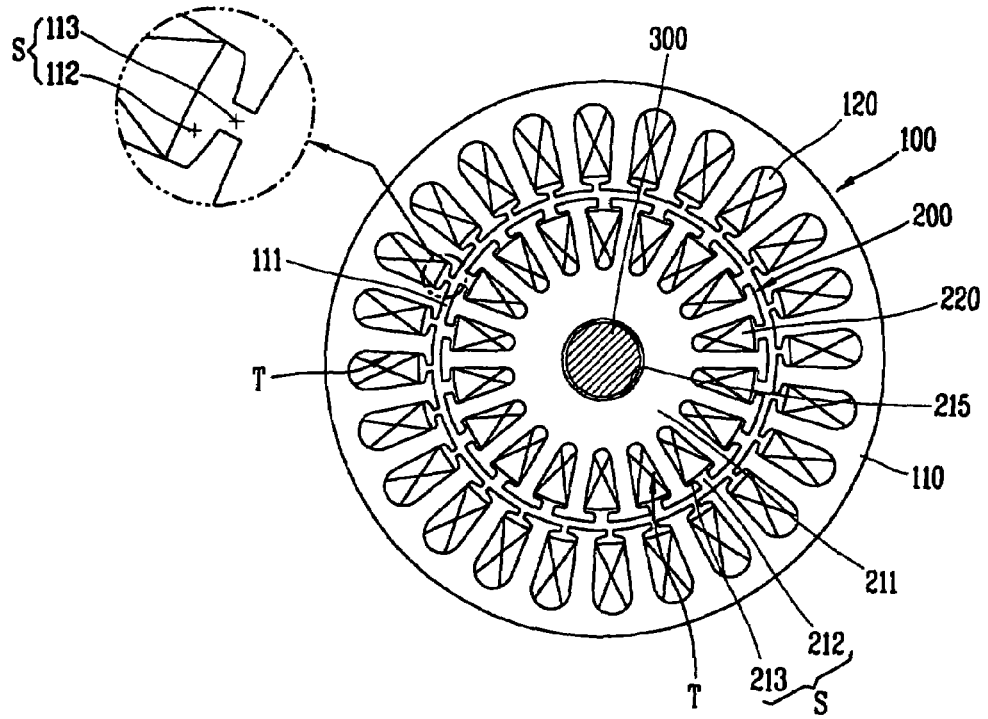
Figure 3:
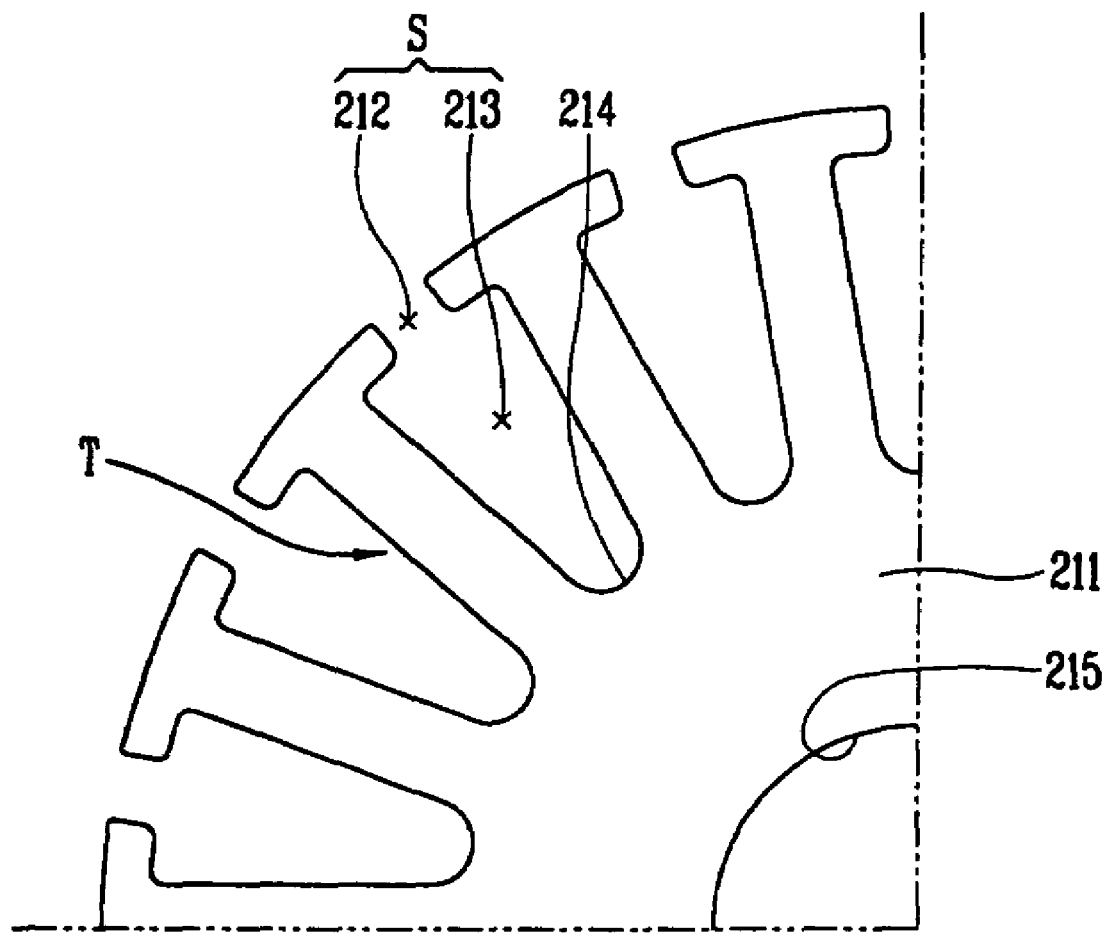
FIG. 3 is a frontal view showing a part of a rotor constituting the universal motor.
Figure 4:
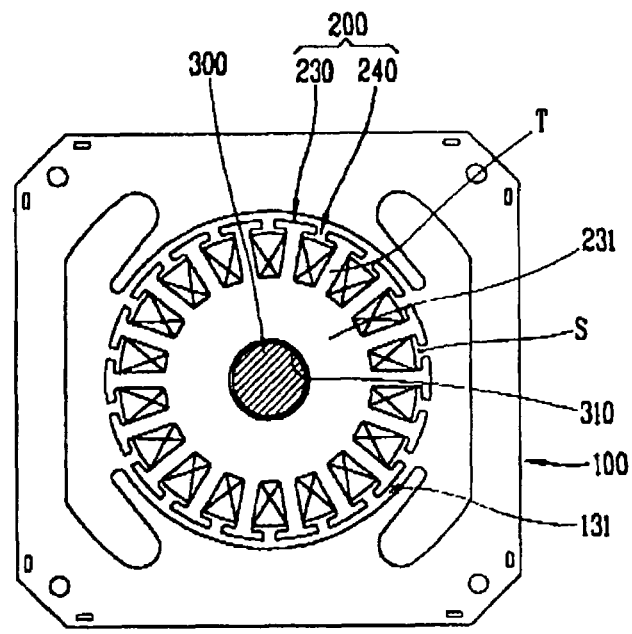
FIG. 4 is a frontal section view showing a universal motor having a rotor according to one embodiment of the present invention.

FIG. 4 is a frontal section view showing a universal motor having a rotor according to one embodiment of the present invention. The same reference numerals are given to the same parts as those of the conventional art.

As shown, the motor comprises: a stator 100 having a through hole 131 therein; a rotor 200 rotatably inserted into the through hole 131 of the stator; a rotational shaft 300 inserted into the center of the rotor 200; and a commutator and a brush (not shown) coupled to the rotational shaft 300 and supplying a current.

The stator 100 comprises a core of a certain shape.

The rotor 200 includes: a core 230 of a certain shape; and a winding coil 240 wound on the core 230. The core 230 is composed of: a shaft hole 310 formed at the center of a cylindrical body portion 231 having a certain length and into which the rotational shaft is inserted; a plurality of slots S penetrated at the edge of the cylindrical body portion 231 in a longitudinal direction and having the winding coil 240 inserted therein. A plurality of teeth T are formed between the slots S.

All slots S can be formed in the same shape, and are radially formed along the cylindrical edge of the cylindrical body portion 231 at the same interval.

Figure 5:
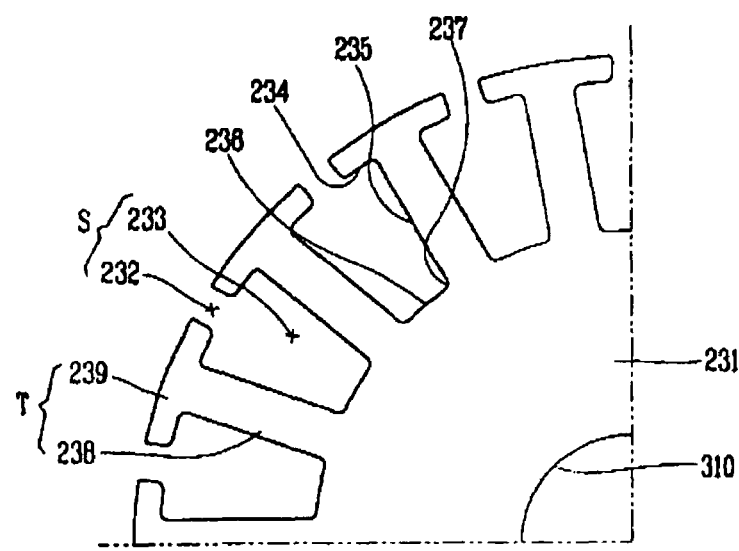
FIG. 5 is a frontal view showing a part of a core constituting the rotor of the motor of the present invention.

As shown in FIG. 5, the slot S is composed: of an opening portion 232 formed at an outer circumferential surface of the cylindrical body portion 231 with a certain width, and an extension portion 233 having an angled shape connected to the opening portion 232 thus to be penetrated toward inside of the cylindrical body portion 231 in a longitudinal direction. The angle-shaped extension portion 233 is composed of: a frontal wall 234 connected to the opening portion 232; a lateral wall 235 respectively connected to both ends of the frontal wall 234; and an end wall 236 that opposes the frontal wall 234 and connecting the lateral walls 235 each other. A connection portion between the lateral walls 235 and the end wall 236 is respectively provided with a rounded corner portion 237.

The end wall 236 is formed as a curved surface having a certain surface area, and the curved surface is formed as a convex surface so as to have the same curvature as an outer circumferential surface of the rotor core 230.

Each end wall 236 of the slots S is formed along the circumference of an imaginary circle concentric with the center of the rotor core 230, that is, with the center of the cylindrical body portion 231 as its midpoint, and each end wall has a certain length.

Both lateral walls 235 of a slot S are formed with an inclination so that a width of the angle-shaped extension portion 233 becomes narrower towards the center of the cylindrical body portion 231. However, the width of each teeth formed by the lateral walls 235 of two adjacent angle-shaped extension portions 233 is constant.

The teeth T formed by the slots S is composed of: a supporting portion 238 having a certain width and length; and a stopping portion 239 formed at the end of the supporting portion 238. A surface for connecting two adjacent teeth T is formed as a curved surface having the same curvature as the outer circumferential surface of the rotor core 230, that is, the outer circumferential surface of the cylindrical body portion 231.

The core 230 of the rotor is formed as a plurality of stacked thin plates having a shape corresponding to a sectional surface of the cylindrical body portion 231.

Figure 6:
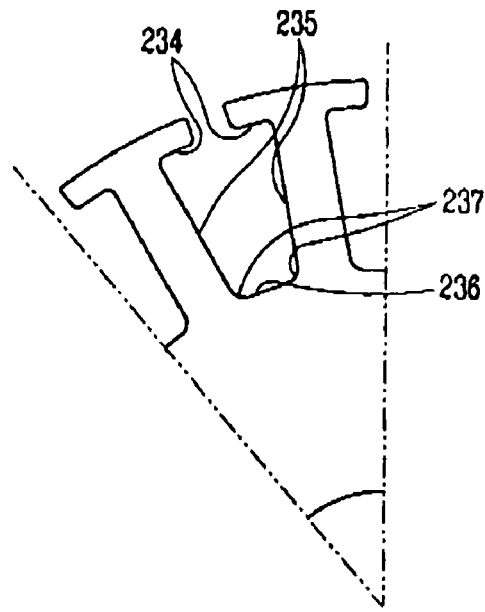
FIG. 6 is a frontal view showing a modification of a slot of the motor rotor.

As a modification example of the end wall 236, as shown in FIG. 6, the end wall can be formed as a planar surface.

The operation of the rotor of a motor according to the present invention will be explained as follows.

When power is supplied to the winding coil 140, a flux is formed at the stator core 130. At the same time, when power is supplied to the winding coil 240 through the brush and the commutator, a flux is formed at the rotor core 230. By an interaction between the flux formed at the stator core 130 and the flux formed at the rotor core 230, the rotor 200 is rotated. A rotation force of the rotor 200 is transmitted to a load through the rotational shaft 300.

Figure 7:
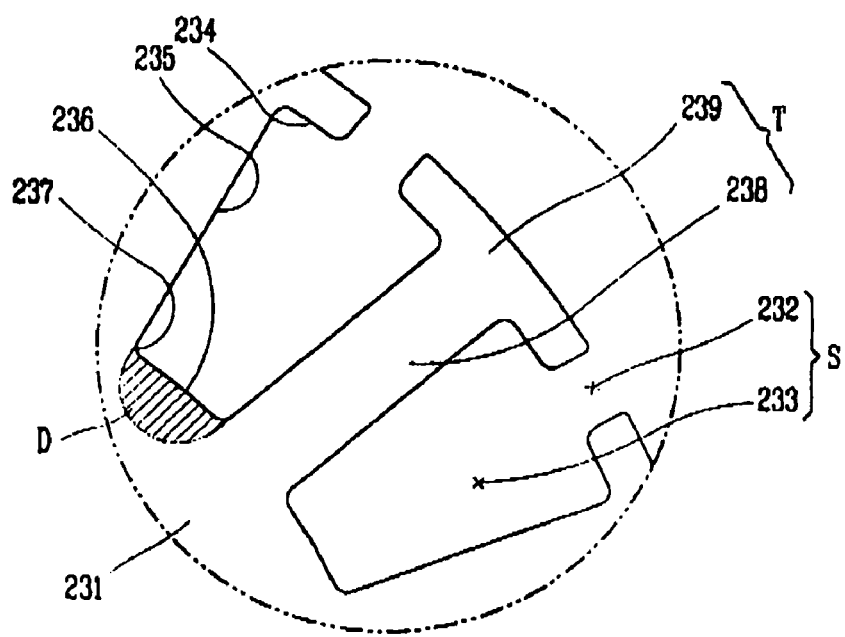
FIG. 7 is a frontal view comparing the rotor slot of the present invention with the conventional rotor slot.

In the rotor core 230, the corner portion 237 is formed at both sides of the end wall 236 constituting the core 230, and the end wall 236 is formed as a curved surface or a planar surface. According to this, under a state that the region in which the coil 240 is wound can be maintained as it is, the size of the slots S becomes relatively small and thereby an effective area of a flux becomes relatively large. That is, in the conventional art, since the end wall of the core slot S is formed as a semi-circle shape for fabrication convenience, a dead space in which the winding coil 220 can not be inserted is formed and thereby an effective area of a flux is decreased. However, in the present invention as shown in FIG. 7, the corner portion 237 respectively formed at both sides of the rear wall 236 of the slot and the end wall 236 is formed as a curved surface. According to this, a volume in which the winding coil 220 can be inserted into is increased as much as a volume D of the dead space in the conventional art thus to relatively increase an effective area of a flux, thereby decreasing a flux resistance.

Also, as the effective area of the flux is increased, a stack height of the rotor core 230, that is, the number of the stacked thin plates can be decreased, and the number of assembly processes can be decreased.

Additionally, as the effective area of the rotor core 230 is increased, the height or the outer diameter of the rotor core 230 can be decreased thereby to reduce the entire size thereof.

FIG. 8 shows experimental results when comparing the motor having a rotor of the present invention with the conventional motor. As shown, in the conventional art, when a length of a rotor, that is, a stacked height of a rotor is 52 mm, an efficiency of a motor is the greatest at 85.44% indicated as the thick line box in FIG. 8. On the contrary, in the present invention, when a length of a rotor, that is, a stacked height of a rotor is 42 mm, an efficiency of a motor is the greatest at 90% indicated as the thick line box in FIG. 8. That is, the rotor of the present invention has a greater efficiency than that of the conventional rotor, while the stacked height thereof is decreased by approximately 20% than that of the conventional rotor.

Figure 9:
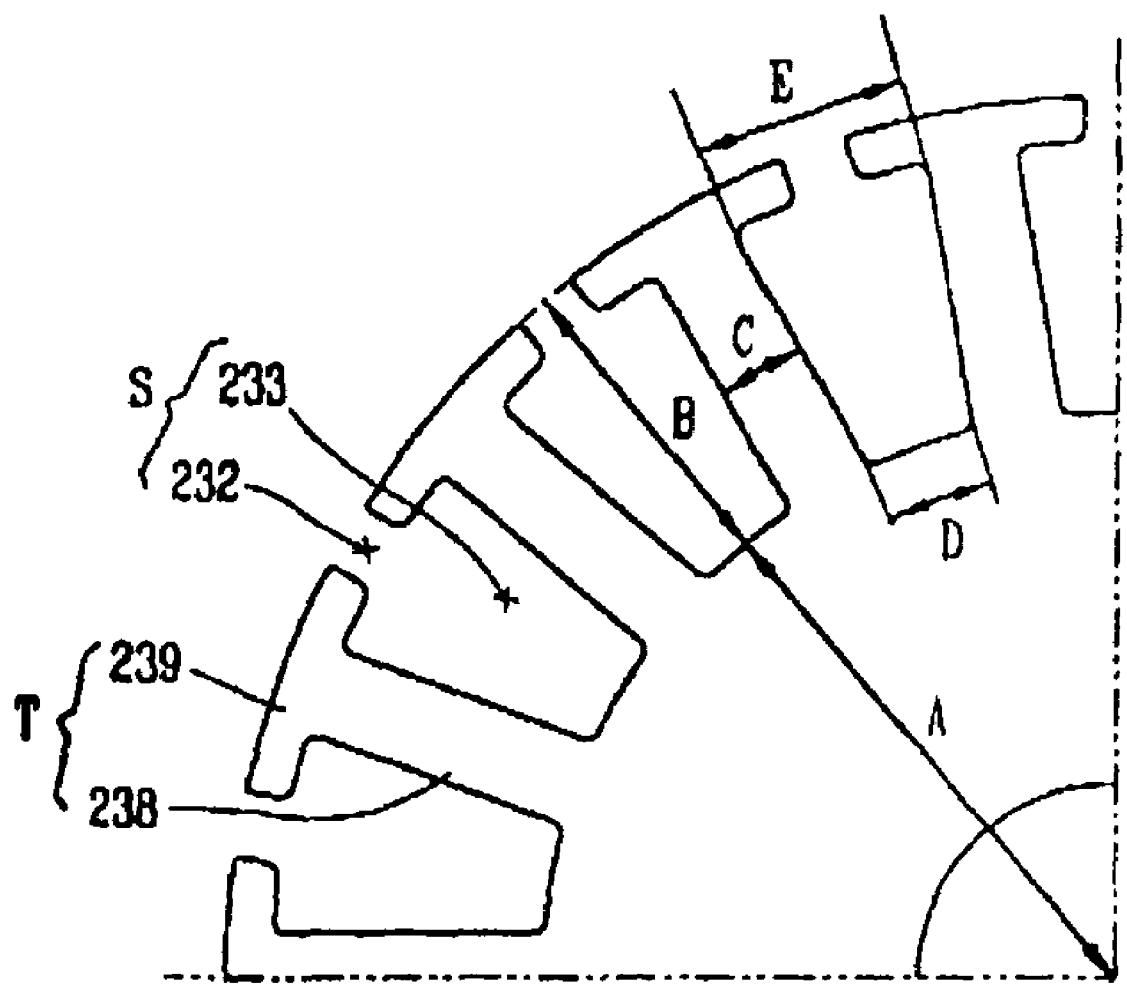
FIG. 9 is a partial enlarged view showing the rotor of the motor of the present invention.

As shown in FIG. 9, the rotor is shaped to have different widths D and E for the slot S in the rotation direction, that is, in the circumferential direction of the rotor core 231, at its bottom or the end wall 236 and top or the frontal wall 234, respectively. Specifically, the bottom width D is sized to be smaller than the top width E and the slot S may be shaped to have a dimensional relationship in such way that the ratio of E/D is larger than 1.5 but less than 2 (1.5<E/D<2). The support portion 238 may be shaped to have a width C in the rotation direction and a dimensional relationship with the bottom width D in such a way that the ratio of D/C is larger than 1 but smaller than 1.5 (1<D/C<1.5). The slot S is further shaped to be distanced from the center of the rotor core in a length of A in the circumferential direction. Specifically, the distance in the circumferential direction between the center of the rotor core and the end wall 236 may have the length of A. Also, the slot S is preferred to be shaped to have the end wall 236 being distanced from the outer circumferential surface of the rotor core in a length of B as shown in FIG. 10. The length A and length B are sized to have a dimensional relationship in such way that the ration of A/B is larger than 1.5 but less than 2 (1.5<A/B<2).

According to this dimensional relationship of the rotor, the magnetic flux increases to have a greater efficiency than that of the conventional rotor, while the stacked height thereof is decreased significantly than that of the conventional rotor.

As aforementioned, the rotor of a motor according to the present invention decreases flux resistance by increasing an effective area of the flux, thereby enhancing the motor efficiency.

Also, the stacked height of the rotor, that is, the number of stacked thin plates can be reduced while maintaining the same efficiency or obtaining greater efficiency as that of the conventional rotor, thereby reducing fabrication costs, increasing assembly productivity, and minimizing the motor size.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A rotor for a motor comprising:
a rotor core including a plurality of plates stacked in an axial direction thereof, each of the plurality of plates including a plurality of slots, each slot having two lateral walls, an end wall, and two round corners respectively connecting inner portions of the two lateral walls and both sides of the end wall,
wherein the rotor has different widths D and E for the slot in a rotation direction defining as a circumferential direction of the rotor core, at an innermost portion and an outermost portion of the slot, respectively, and wherein the slot S has a dimensional relationship in such way that a ratio of the outermost width over the innermost width (E/D) is larger than 1.5 but less than 2 (1.5<E/D<2).

2. The rotor of claim 1, wherein the lateral wall has a width C in the rotation direction and a dimensional relationship with the innermost width D of the slot in such a way that a ratio of D/C is larger than 1 but smaller than 1.5 (1<D/C<1.5).

3. The rotor of claim 1, wherein a distance in the circumferential direction between the center of the rotor core and the end wall has a certain length of A and the end wall is distanced from the outermost circumferential surface of the rotor core in a certain length of B, and wherein the length A and length B have a dimensional relationship in such way that the ratio of A/B is larger than 1.5 but less than 2 (1.5<A/B<2).

4. The rotor of claim 1, wherein a tooth formed by two adjacent slots and on which a winding coil is wound is connected to an inner side surface of adjacent teeth by a curved surface having a same curvature as an outer circumferential surface of the rotor core in such a manner to maximize a flow path of a flux and allows a minimal stack height of the plurality of plates.

5. A motor comprising:
a rotor core with,
a cylindrical body;
a plurality of slots penetratingly formed at an outer circumferential surface of the cylindrical body in a longitudinal direction of the cylindrical body; and
a plurality of teeth formed between the slots respectively, wherein each of the plurality of slots includes:
an opening portion formed at the outer circumferential surface of the cylindrical body; and
an extension portion connected to the opening portion and penetratingly formed as an angle shape in the longitudinal direction of the cylindrical body,
wherein the rotor core has different widths D and E for the slot in a rotation direction defining as a circumferential direction of the rotor core, at an innermost portion and an outermost portion of the slot, respectively, and wherein the slot S has a dimensional relationship in such way that a ratio of the outermost width over the innermost width (E/D) is larger than 1.5 but less than 2 (1.5<E/D<2).

6. The motor of claim 5, wherein the teeth has a width C in the rotation direction and a dimensional relationship with the innermost width D of the slot in such a way that a ratio of D/C is larger than 1 but smaller than 1.5 (1<D/C<1.5).

7. The motor of claim 5, wherein a distance in the circumferential direction between the center of the rotor core and the innermost portion of the slot has a certain length of A and the innermost portion of the slot is distanced from the outermost circumferential surface of the rotor core in a certain length of B, and wherein the length A and length B have a dimensional relationship in such way that the ratio of A/B is larger than 1.5 but less than 2 (1.5<A/B<2).

8. The rotor of claim 5, wherein a tooth formed by two adjacent slots and on which a winding coil is wound is connected to an inner side surface of adjacent teeth by a curved surface having a same curvature as an outer circumferential surface of the rotor core in such a manner to maximize a flow path of a flux and allows a minimal stack height of the plurality of relatively thin plates.

9. The motor of claim 8, wherein the rotor core comprises a plurality of plates stacked in the axial direction of the core.

10. The motor of claim 9, wherein the decreased height of the rotor core is based on the number of the stacked thin plates that is reducible as an effective area of the flux is increased.

11. A rotor comprising:
a cylindrical core formed of a plurality of plates stacked in an axial direction thereof, each plate having a plurality of radial extensions;
one radial extension and an adjacent radial extension forming a slot therebetween; and
each slot having two lateral walls with rounded corners that smoothly join with opposing end portions of an end wall, wherein a distance in a circumferential direction between the center of the core and the end wall has a certain length of A and the end wall is distanced from an outermost circumferential surface of the core in a certain length of B, and wherein the length A and length B have a dimensional relationship in such way that a ratio of A/B is larger than 1.5 but less than 2 (1.5<A/B<2).

12. The rotor of claim 11, wherein the rotor has different widths D and B for the slot in a rotation direction, defining as a circumferential direction of the rotor core, at an innermost portion and an outermost portion of the slot, respectively, and wherein the slot S has a dimensional relationship in such way that a ratio of the outermost width over the innermost width (E/D) is larger than 1.5 but less than 2 (1.5<E/D<2).

13. The rotor of claim 12, wherein the radial extension has a width C in the rotation direction and a dimensional relationship with the innermost width D of the slot in such a way that a ratio of D/C is larger than 1 but smaller than 1.5 (1<D/C<1.5).

14. The rotor of claim 11, wherein a tooth formed by two adjacent slots and on which a winding coil is wound is connected to an inner side surface of adjacent teeth by a curved surface having a same curvature as an outer circumferential surface of the rotor core in such a manner to maximize a flow path of a flux and allows a minimal stack height of the plurality of relatively thin plates.

15. The rotor of claim 11, wherein the dimensional relationship of the slot allows a maximum flow of flux with a minimum number of plates being stacked.

16. The rotor of claim 11, wherein the dimensional relationship of the slot allows a maximum number of coil windings around each radial extension.

17. The rotor of claim 11, wherein the dimensional relationship of the slot allows an increase in effective area of flux and a decrease in flux resistance.

18. The rotor of claim 11, wherein the dimensional relationship of the slot allows a minimal height and/or a minimal outer diameter of the core.

\* \* \* \* \*